US007568148B1

(12) United States Patent
Bharat et al.

(10) Patent No.: US 7,568,148 B1
(45) Date of Patent: Jul. 28, 2009

(54) METHODS AND APPARATUS FOR CLUSTERING NEWS CONTENT

(75) Inventors: Krishna Bharat, San Jose, CA (US);
Michael Curtiss, Sunnyvale, CA (US);
Michael Schmitt, Mountain View, CA (US)

(73) Assignee: Google Inc., Mountain View, CA (US)

( * ) Notice: Subject to any disclaimer, the term of this patent is extended or adjusted under 35 U.S.C. 154(b) by 627 days.

(21) Appl. No.: 10/611,269

(22) Filed: Jun. 30, 2003

Related U.S. Application Data

(60) Provisional application No. 60/412,287, filed on Sep. 20, 2002.

(51) Int. Cl.
*G06F 17/00* (2006.01)
(52) U.S. Cl. ............... 715/200; 715/229; 715/205; 707/7; 707/203
(58) Field of Classification Search ........... 715/513, 715/511, 500, 200, 203, 205, 234, 229; 707/200, 707/203, 7, 205
See application file for complete search history.

(56) References Cited

U.S. PATENT DOCUMENTS

| | | | |
|---|---|---|---|
| 5,293,552 | A | 3/1994 | Aalbersberg |
| 5,724,567 | A | 3/1998 | Rose et al. |
| 5,787,420 | A | 7/1998 | Tukey et al. |
| 5,907,836 | A * | 5/1999 | Sumita et al. ............... 707/2 |
| 6,026,388 | A | 2/2000 | Liddy et al. |
| 6,275,820 | B1 | 8/2001 | Navin-Chandra et al. |
| 6,453,315 | B1 | 9/2002 | Weissman et al. |
| 6,463,265 | B1 | 10/2002 | Cohen et al. |
| 6,558,431 | B1 | 5/2003 | Lynch et al. |
| 6,594,654 | B1 * | 7/2003 | Salam et al. ................ 707/3 |
| 6,601,075 | B1 | 7/2003 | Huang et al. |
| 6,647,383 | B1 | 11/2003 | August et al. |
| 6,654,742 | B1 * | 11/2003 | Kobayashi et al. ........... 707/7 |
| 6,785,671 | B1 | 8/2004 | Bailey et al. |
| 6,804,688 | B2 | 10/2004 | Kobayashi et al. |
| 6,859,800 | B1 | 2/2005 | Roche et al. |
| 6,952,806 | B1 | 10/2005 | Card et al. |

(Continued)

OTHER PUBLICATIONS

Y. Rasolofo et al., "Result merging strategies for a current news metasearcher," Information Processing and Management, Elsevier Science Publishers, vol. 39, No. 4, Jul. 2003, 29 pages.
D. Zhang et al., "A novel Web usage mining approach for search engines," Computer Networks, Elsevier Science Publishers, vol. 39, No. 3, Jun. 21, 2002, 8 pages.

(Continued)

*Primary Examiner*—Thu Huynh
(74) *Attorney, Agent, or Firm*—Harrity & Harrity, LLP

(57) ABSTRACT

Methods and apparatus are described for scoring documents in response, in part, to parameters related to the document, source, and/or cluster score. Methods and apparatus are also described for scoring a cluster in response, in part, to parameters related to documents within the cluster and/or sources corresponding to the documents within the cluster. In one embodiment, the invention may identify the source; detect a plurality of documents published by the source; analyze the plurality of documents with respect to at least one parameter; and determine a source score for the source in response, in part, to the parameter. In another embodiment, the invention may identify a topic; identify a plurality of clusters in response to the topic; analyze at least one parameter corresponding to each of the plurality of clusters; and calculate a cluster score for each of the plurality of clusters in response, in part, to the parameter.

28 Claims, 10 Drawing Sheets

U.S. PATENT DOCUMENTS

| | | | |
|---|---|---|---|
| 6,978,419 | B1 * | 12/2005 | Kantrowitz .................. 715/511 |
| 7,080,079 | B2 * | 7/2006 | Yu ............................... 707/10 |
| 2002/0038430 | A1 | 3/2002 | Edwards et al. |
| 2002/0073161 | A1 * | 6/2002 | Yamazaki et al. ........... 709/206 |
| 2002/0103775 | A1 | 8/2002 | Quass et al. |
| 2003/0009496 | A1 * | 1/2003 | McBrearty et al. ....... 707/501.1 |
| 2003/0014383 | A1 * | 1/2003 | Cho et al. ...................... 707/1 |
| 2003/0120654 | A1 | 6/2003 | Edlund et al. |
| 2003/0182270 | A1 | 9/2003 | Kuno et al. |
| 2003/0220913 | A1 * | 11/2003 | Doganata et al. ................ 707/3 |
| 2005/0102130 | A1 | 5/2005 | Quirk et al. |
| 2005/0203970 | A1 * | 9/2005 | McKeown et al. .......... 707/203 |
| 2005/0289140 | A1 | 12/2005 | Ford et al. |
| 2006/0089947 | A1 * | 4/2006 | Gallivan et al. ............. 707/102 |
| 2006/0259476 | A1 * | 11/2006 | Kadayam et al. ................ 707/3 |
| 2006/0277175 | A1 * | 12/2006 | Jiang et al. ..................... 707/5 |
| 2007/0022374 | A1 * | 1/2007 | Huang et al. ................. 715/513 |

OTHER PUBLICATIONS

D. Zhang et al., "An efficient algorithm to rank Web resources," Computer Networks, Elsevier Science Publishers, vol. 33, No. 1-6, Jun. 2000, 7 pages.

G. Meghabghab, "Stochastic Simulations of Rejected World Wide Web Pages," Proceedings of the $8^{th}$ International Symposium on Modeling, Analysis and Simulation of Computer and Telecommunication Systems, Aug. 29-Sep. 1, 2000, pp. 483-491.

K. Bharat et al., co-pending U.S. Appl. No. 10/611,267, filed Jun. 30, 2003, entitled Methods and Apparatus for Ranking Documents.

M. Henzinger et al., "Query-Free News Search", ACM, May 20-24, 2003, pp. 1-10.

L. Egghe et al., "The Influence of Publication Delays on the Observed Aging Distribution of Scientific Literature", 2000, Journal of the American Society of Information Science, pp. 158-165.

* cited by examiner

| 760 | 765 | 770 | 775 | 780 |

Figure 7 B

METHODS AND APPARATUS FOR CLUSTERING NEWS CONTENT

CROSS REFERENCE TO RELATED APPLICATIONS

The present application claims benefit of U.S. Provisional Patent Application No. 60/412,287 filed on Sep. 20, 2002, entitled "METHODS AND APPARATUS FOR CLUSTERED AGGREGATION OF NEWS CONTENT" listing the same inventors, the disclosure of which is hereby incorporated by reference.

FIELD OF THE INVENTION

The present invention relates generally to clustering content and, more particularly, to clustering content based on relevance.

BACKGROUND OF THE INVENTION

There are many sources throughout the world that generate documents that contain content. These documents may include breaking news, human interest stories, sports news, scientific news, business news, and the like.

The Internet provides users all over the world with virtually unlimited amounts of information in the form of articles or documents. With the growing popularity of the Internet, sources such as newspapers and magazines which have historically published documents on paper media are publishing documents electronically through the Internet. There are numerous documents made available through the Internet. Often times, there is more information on a given topic than a typical reader can process.

For a given topic, there are typically numerous documents written by a variety of sources. To get a well-rounded view on a given topic, users often find it desirable to read documents from a variety of sources. By reading documents from different sources, the user may obtain multiple perspectives about the topic.

However, with the avalanche of documents written and available on a specific topic, the user may be overwhelmed by the shear volume of documents. Further, a variety of factors can help determine the value of a specific document to the user. Some documents on the same topic may be duplicates, outdated, or very cursory. Without help, the user may not find a well-balanced cross section of documents for the desired topic.

A user who is interested in documents related to a specific topic typically has a finite amount of time locate such documents. The amount of time available spent locating documents may depend on scheduling constraints, loss of interest, and the like. Many documents on a specific topic which may be very valuable to the user may be overlooked or lost because of the numerous documents that the user must search through and the time limitations for locating these documents.

It would be useful, therefore, to have methods and apparatus for clustering content.

SUMMARY OF THE INVENTION

Methods and apparatus are described for scoring documents in response, in part, to parameters related to the document, source, and/or cluster score. Methods and apparatus are also described for scoring a cluster in response, in part, to parameters related to documents within the cluster and/or sources corresponding to the documents within the cluster. In one embodiment, the invention may identify the source; detect a plurality of documents published by the source; analyze the plurality of documents with respect to at least one parameter; and determine a source score for the source in response, in part, to the parameter. In another embodiment, the invention may identify a topic; identify a plurality of clusters in response to the topic; analyze at least one parameter corresponding to each of the plurality of clusters; and calculate a cluster score for each of the plurality of clusters in response, in part, to the parameter.

Additional aspects of the present invention are directed to computer systems and to computer-readable media having features relating to the foregoing aspects.

BRIEF DESCRIPTION OF THE DRAWINGS

The accompanying drawings, which are incorporated in and constitute a part of this specification, illustrate one embodiment of the invention and, together with the description, explain one embodiment of the invention. In the drawings.

FIG. 7B is a simplified block diagram illustrating one embodiment in which the invention may be implemented.

DETAILED DESCRIPTION

The following detailed description of the invention refers to the accompanying drawings. The detailed description does not limit the invention. Instead, the scope of the invention is defined by the appended claims and equivalents.

The present invention includes methods and apparatus for creating clusters. The present invention also includes methods and apparatus for ranking clusters. Those skilled in the art will recognize that many other implementations are possible, consistent with the present invention.

The term "document" may include any machine-readable or machine-storable work product. A document may be a file, a combination of files, one or more files with embedded links to other files. These files may be of any type, such as text, audio, image, video, and the like. Further, these files may be formatted in a variety of configurations such as text, HTML, Adobe's portable document format (PDF), email, XML, and the like.

In the context of traditional publications, a common document is an article such as a news article, a human-interest article, and the like. In the context of the Internet, a common document is a Web page. Web pages often include content and may include embedded information such as meta information, hyperlinks, and the like. Web pages also may include embedded instructions such as Javascript. In many cases, a document has a unique, addressable, storage location and can therefore be uniquely identified by this addressable location. A universal resource locator (URL) is a unique address used to access information on the Internet.

For the sake of simplicity and clarity, the term "source" refers to an entity that has published a corresponding document.

A. ENVIRONMENT AND ARCHITECTURE

Figure 1:
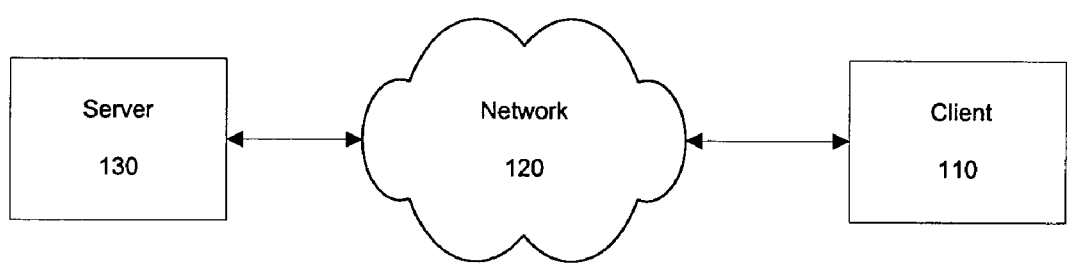
FIG. 1 is a diagram illustrating an environment within which the invention may be implemented.

FIG. 1 is a diagram illustrating an environment within which the invention may be implemented. The environment includes a client 110, a network 120, and a server 130.

The client 110 may be utilized by a user that submits a query to the server 130 and a user that retrieves information in response to the query. In one embodiment, the information includes documents which may be viewable by the user through the client 110. In one embodiment, the information is organized within clusters which are ranked, sorted, and optimized to provide useful information to the user. The factors that are utilized to analyze each cluster may include the recency of the document, the source of the document, the importance of the content within the document, and the like.

In one embodiment, the client 110 may be a web browser, and the server 130 includes a clustering system.

The network 120 may function as a conduit for transmissions between the client 110 and the server 130. In one embodiment, the network 120 is the Internet. In another embodiment, the network 120 may be any type of transmission means.

The server 130 interfaces with the client 110 through the network 120. The clustering system may be within the server 130. The clustering system may include additional elements. In one embodiment, the clustering system performs a variety of functions such as analyzing clusters and documents within clusters which are explained in more detail below and shown in reference to FIGS. 3 through 9.

Figure 2:
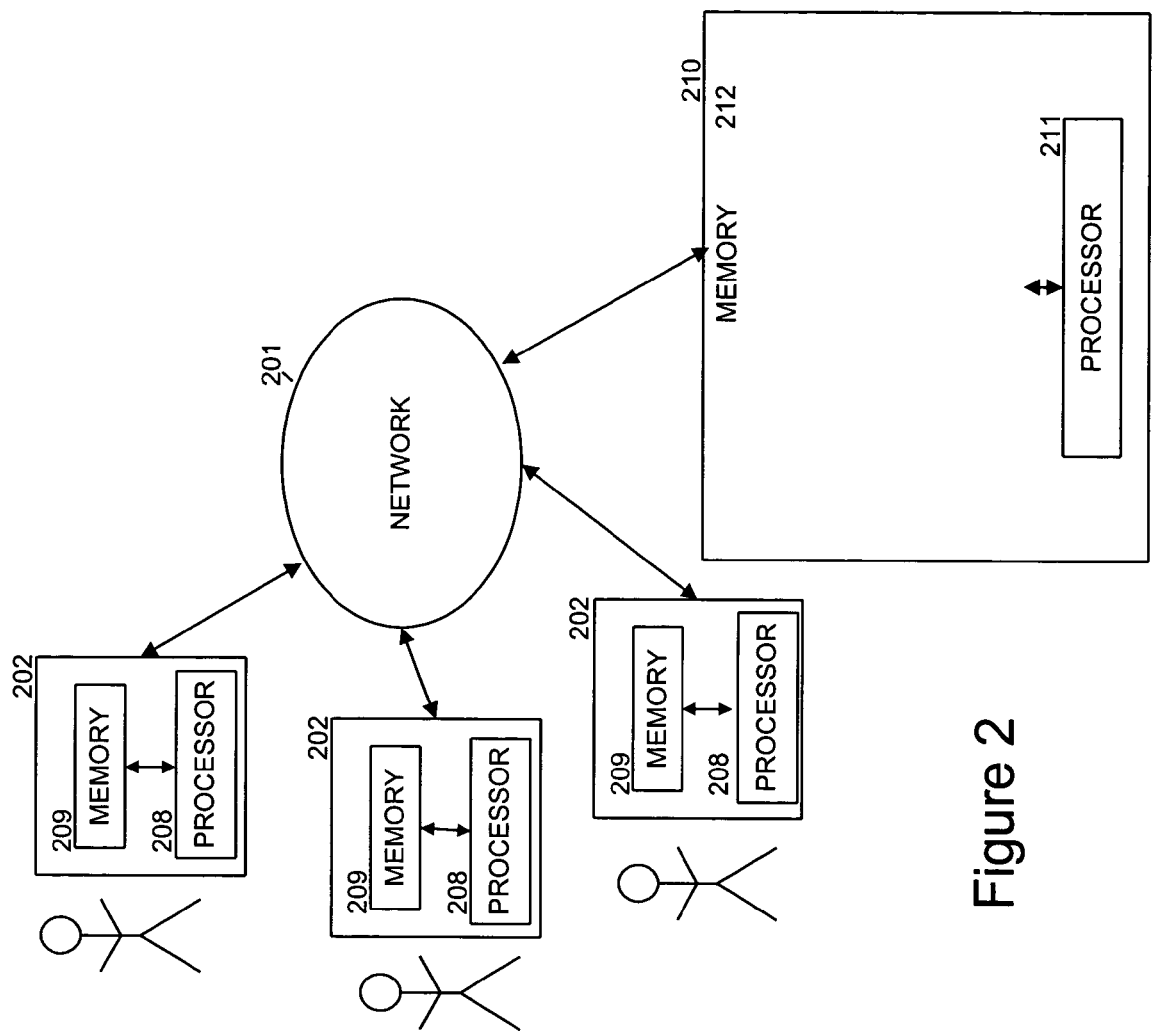
FIG. 2 is a simplified block diagram illustrating one embodiment in which the invention may be implemented.

FIG. 2 is a simplified diagram illustrating an exemplary architecture in which the present invention may be implemented. The exemplary architecture includes a plurality of web browsers 202, a server device 210, and a network 201. In one embodiment, the network 201 may be the Internet. The plurality of web browsers 202 are each configured to include a computer-readable medium 209, such as random access memory, coupled to a processor 208. Processor 208 executes program instructions stored in the computer-readable medium 209. In another embodiment, the plurality of web browsers 202 may also include a number of additional external or internal devices, such as, without limitation, a mouse, a CD-ROM, a keyboard, and a display.

Similar to the plurality of web browsers 202, the server device 210 may include a processor 211 coupled to a computer-readable medium 212. The server device 210 may also include a number of additional external or internal devices, such as, without limitation, a secondary storage element, such as database 240.

The plurality of target processors 208 and the server processor 211 can be any of a number of well known computer processors, such as processors from Intel Corporation, of Santa Clara, Calif. In general, the plurality of web browsers 202 may be any type of computing platform connected to a network and that interacts with application programs, such as a personal computer, a mobile lap top, a personal digital assistant, a "smart" cellular telephone, or a pager. The server 210, although depicted as a single computer system, may be implemented as a network of computer processors.

The plurality of web browsers 202 and the server 210 may include the clustering system as embodied within the server 130 (FIG. 1). In one embodiment, the plurality of computer-readable medium 209 and 212 may contain, in part, portions of the clustering system. Additionally, the plurality of web browsers 202 and the server 210 are configured to send and receive information for use with the clustering system. Similarly, the network 201 is configured to transmit information for use with the clustering system.

B. OPERATION

The flow diagrams as depicted in FIGS. 3, 5, 7A, 8, and 9 illustrate one embodiment of the invention. In each embodiment, the flow diagrams illustrate one aspect of processing documents and/or sources of documents using the clustering system.

The blocks within the flow diagram may be performed in a different sequence without departing from the spirit of the invention. Further, blocks may be deleted, added, or combined without departing from the spirit of the invention.

A large number of documents may be electronically available for any particular topic through the Internet. The quality of these documents can range from top quality journalism to unreliable reporting. The source of a document may predict the quality of the particular document. For example, a highly regarded source may, on average, publish higher quality documents compared to documents published by a less highly regarded source.

Figure 3:
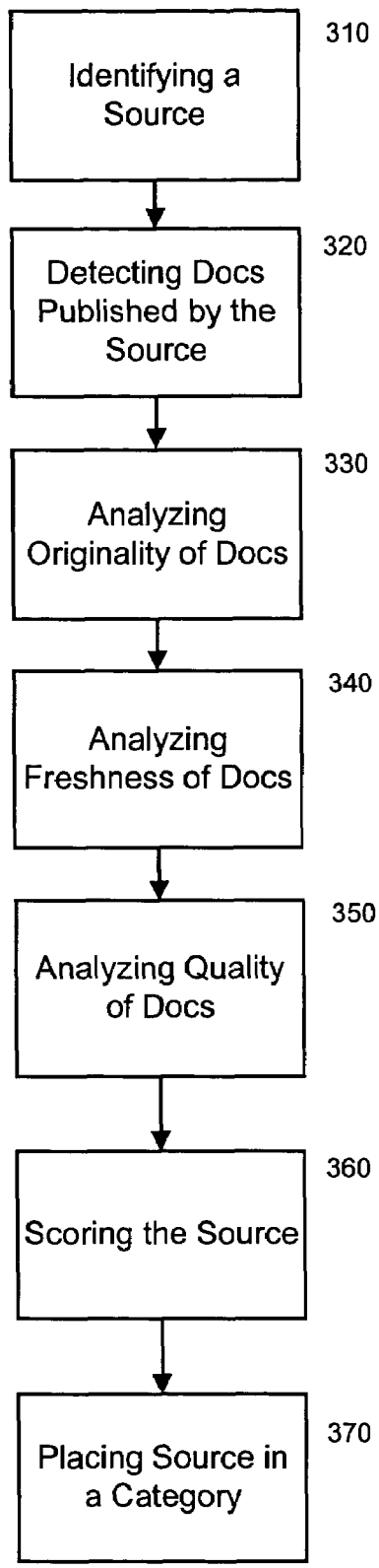
FIG. 3 is a flow diagram for ranking sources, consistent with one embodiment of the invention.

The flow diagram in FIG. 3 illustrates one embodiment for ranking sources. In Block 310, a specific source is identified.

In Block 320, documents which are published by the specific source are detected. In one embodiment, the detection of these documents published by a specific source may be limited to documents published within the last month. In other embodiment, these documents may include all documents published by the specific source.

In Block 330, the originality of the documents are analyzed. In one embodiment, duplicate documents which are published by the same source are removed. For example, duplicate documents which are published more than once by the same source are removed so that only the original document remains. Duplicate documents may be found by comparing the text of the documents published by the source. If the text of both documents are a close match, then one of the documents may be considered a duplicate.

In another example, non-original documents which are re-published by different sources are removed. For example, many news wire services such as Associated Press and Reuters carry original documents which are re-published by other sources. These non-original documents that are re-published may be found by comparing the text of the document re-published by one source and the text of the original document published by a different source. If both documents are a close match, the original document may be determined by finding the document with the earliest publication date. For example, the first source to publish identical documents may be considered the original author, and the corresponding document is considered the canonical version with the remaining subsequent versions considered duplicates.

To facilitate an efficient textual analysis of comparing the documents published by the source with documents from other sources, the documents from other sources may be limited to those which have been published within a given length of time such as within the last month.

In Block 340, the documents are analyzed for freshness. In one embodiment, freshness may be measured by a combination of the frequency in which the source generates new content and the speed in which a document is published after the corresponding event has occurred. For example, freshness of a source can be measured by the number of canonical documents generated by the source over the course of X number of days. The freshness of a source can also be measured by an average lapse in time between an event and the publication of a document regarding the event.

Several schemes may be utilized to identify which documents are examined for freshness in the Block 340. For example, the canonical documents from the Block 330 are analyzed for freshness. In another example, all the documents including both canonical and duplicates as identified in the Block 320 are analyzed for freshness.

In Block 350, the documents are analyzed for overall quality. There are multiple ways to analyze the document for overall quality. For example, the overall quality of the documents by the source may be judged directly by humans. In another example, the overall quality of the documents may be indirectly assessed by utilizing circulation statistics of the source.

In another example, the overall quality of the documents may also be assessed by utilizing the number hit or views the documents received within an arbitrary time frame. In yet another example, the overall quality of the documents may also be assessed by measuring the number of links pointing to the documents published by the source.

In Block 360, the source is scored based on multiple factors such as the number of documents published, the originality of the documents, the freshness of the documents, and the quality of the documents. In one embodiment, the factors such as number of documents, originality, freshness, and quality may be weighted according the desired importance of these factors.

For example, the score of the source is stored as part of a database. The database may be located within the server 210 or accessible to the server 210 over the network 201.

Figure 4:
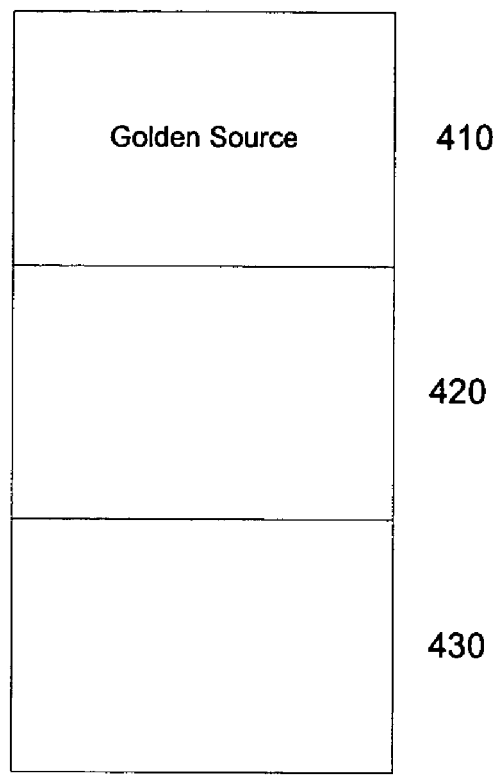
FIG. 4 is a simplified diagram illustrating multiple categories for sources, consistent with one embodiment of the invention.
Figure 4:
Figure 4:
Figure 4:
Figure 4:
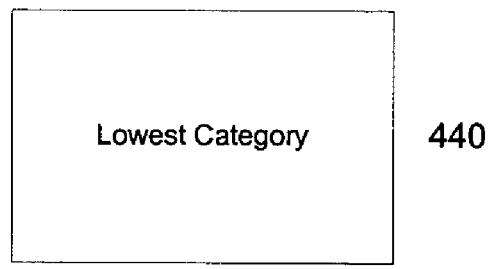

In Block 370, the source is categorized in response, at least in part, to the score from the Block 360. In one embodiment, the source may be placed into any number categories. For example, FIG. 4 illustrates categories 410, 420, 430, and 440 for exemplary purposes. Any number of categories may be utilized to illustrate the different levels of sources. The category 410 is shown as the golden source level; the category 440 is shown as the lowest level; and the categories 420 and 430 are shown as intermediate levels. In one embodiment, the threshold for sources achieving the category 410 (golden source level) is targeted for sources that carry a substantial number of canonical documents. In one embodiment, between 5% to 10% of all sources are targeted to fall within the golden source level. Other targets and levels may be utilized without departing form the invention.

The categorization of the source in the Block 370 may be stored as part of a database. The database may be located within the server 210 or accessible to the server 210 over the network 201.

Figure 5:
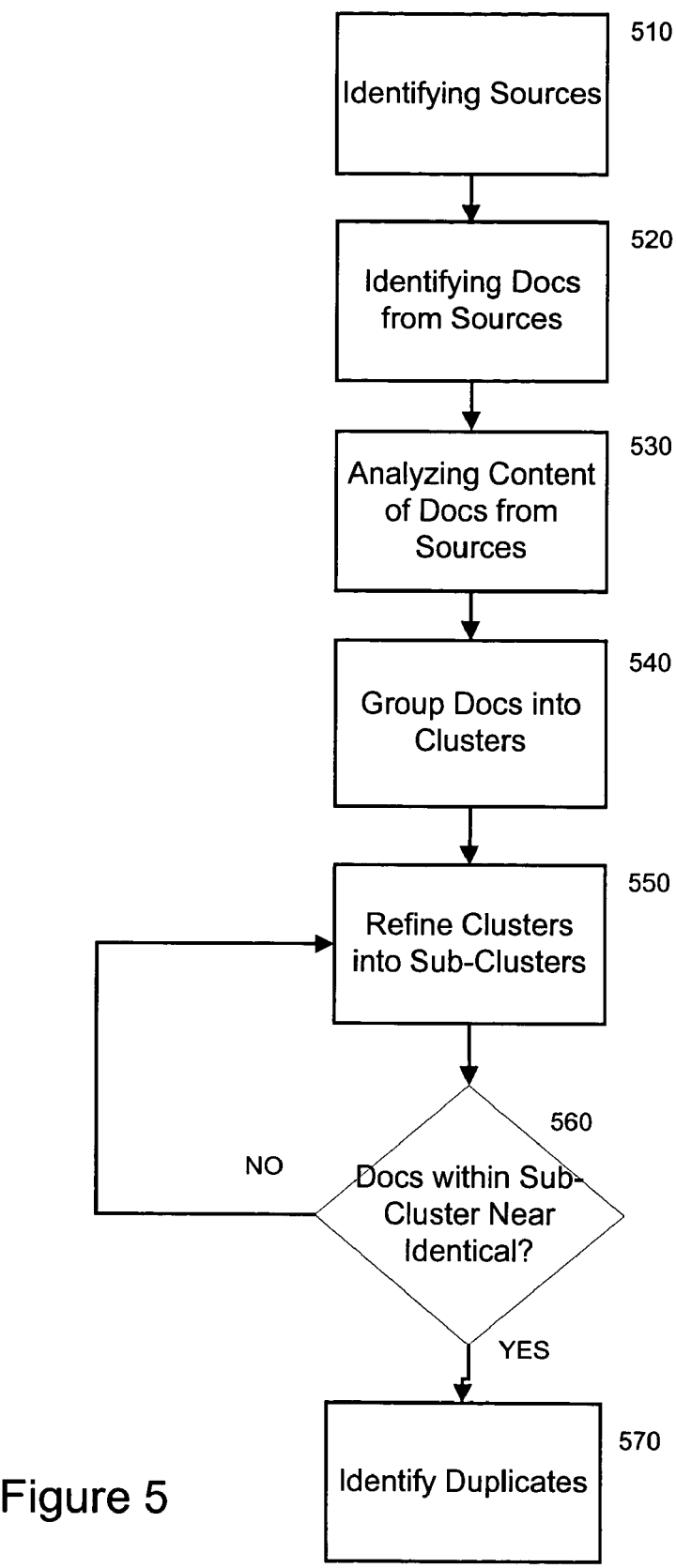
FIG. 5 is a flow diagram for defining clusters and sub-clusters, consistent with one embodiment of the invention.

The flow diagram in FIG. 5 illustrates one embodiment of defining clusters, sub-clusters, and documents within the clusters and sub-clusters.

In Block 510, a plurality of sources are identified. For example, the clustering system 130 may detect the plurality of sources from one or more categories illustrated within FIG. 4. These sources may be limited to sources associated with specific categories such as "golden sources".

In Block 520, documents published by the plurality of sources, as defined in the Block 510, are identified. For illustrative purposes, documents 610, 620, 630, 640, and 650 (FIG. 6) represent exemplary documents published by the plurality of sources.

In Block 530, the documents identified in the Block 520 are analyzed for their content. For example, a topic or subject matter may be extrapolated from the analysis of the content from each of these documents.

Each document may contain a document vector which describes the topic or subject matter of the document. For example, the document vector may also contain a key term which characterizes the topic or subject matter of the document.

In Block 540, the documents identified in the Block 520 are grouped into one or more clusters. In one example, the documents may be clustered using a text clustering technique such as hierarchical agglomerative cluster. In another example, various other clustering techniques may be utilized.

The documents may be clustered by measuring the distance between the documents. For example, the document vector for each document maybe utilized to measure the similarity between the respective documents. A common information retrieval (IR) technique such as term frequency and inverse document frequency (TFIDF) may be utilized to match document vectors.

Various properties of the document vectors and key terms may aid in measuring the distance between each document. For example, the document vectors and key terms which are identified as titles, initial sentences, and words that are "named entities" may have increased importance and may be given increased weighting for measuring the similarities between documents. Named entities typically denote a name of a person, place, event, and/or organization. Named entities may provide additional value, because they are typically mentioned in a consistent manner for a particular event regardless of the style, opinion, and locality of the source.

Figure 6:
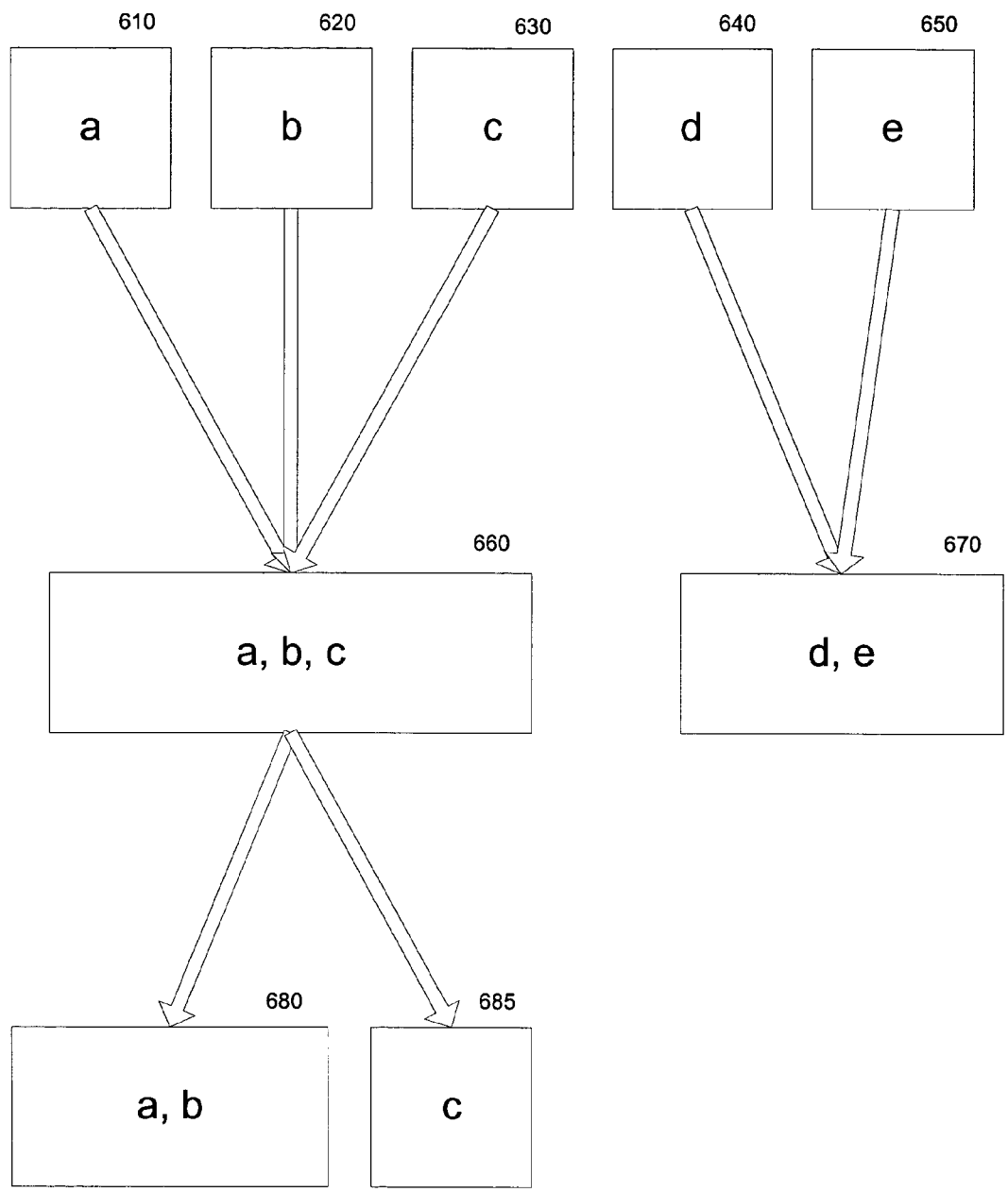
FIG. 6 is a simplified diagram illustrating exemplary documents, clusters, and sub-clusters, consistent with one embodiment of the invention.

For illustrative purposes, the documents 610, 620, and 630 are shown grouped together in a cluster 660 in FIG. 6. Similarly, the documents 640 and 650 are shown grouped together in a cluster 670 in FIG. 6. In this example, the documents 610, 620, and 630 are determined to have more similarities than the documents 640 and 650.

In Block 550, the documents within the clusters which were formed in Block 540 may be further refined into sub-clusters. The documents within a cluster may be further analyzed and compared such that sub-clusters originating from the cluster may contain documents which are even more closely related to each other. For example, depending on the particular cluster, each cluster may be refined into sub-clusters. Additionally, the sub-cluster may contain a sub-set of documents which are included in the corresponding cluster, and the documents within the sub-cluster may have greater similarities than the documents within the corresponding cluster.

For example, the cluster 660 includes documents 610, 620, and 630 as shown in FIG. 6. The cluster 660 is further refined into sub-clusters 680 and 685. The sub-cluster 680 includes the documents 610 and 620. In this example, the documents 610 and 620 within the sub-cluster 680 are more closely related to each other than the document 630 which is isolated in a different sub-cluster 685.

The comparison of document vectors and key terms and other techniques as discussed in association with the Block 540 may be utilized to determine sub-clusters.

In Block 560, the documents within a sub-cluster are checked for their level of similarity. If there are multiple documents within the sub-cluster, and the documents are not identical enough, then the documents within the sub-cluster may be further refined and may be formed into lower level sub-clusters in Block 550. When sub-clusters are formed into lower level sub-clusters, a stricter threshold is utilized to group sets of identical or near identical documents into these lower level sub-clusters.

For the sake of clarity, lower level sub-clusters are not shown in FIG. 6. However, forming lower level sub-clusters from a sub-cluster is analogous to forming the sub-clusters 680 and 685 from the cluster 660.

If there are multiple documents within the sub-cluster, and the documents are identical enough, then the canonical document is identified by the earliest publication time and the remaining documents may be considered duplicates in Block 570.

Figure 7A:
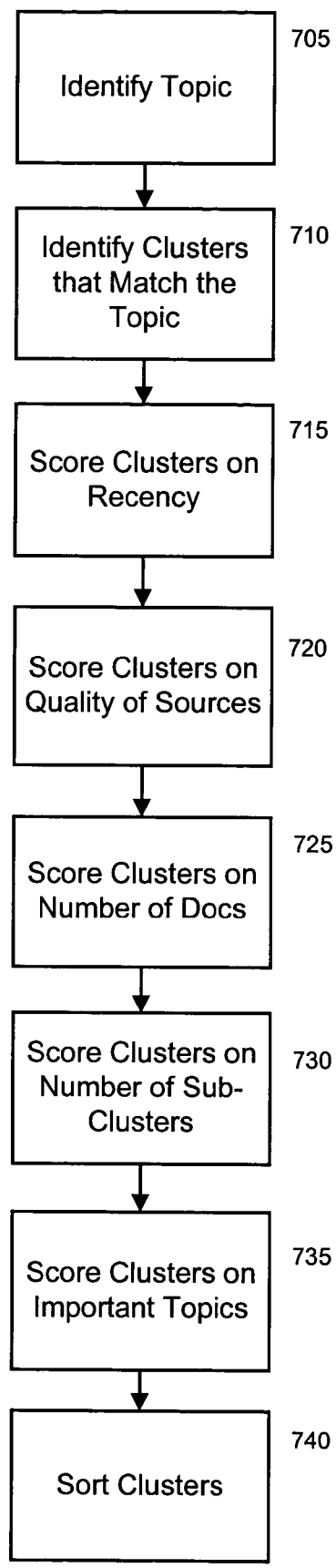
FIG. 7A is a flow diagram for scoring clusters, consistent with one embodiment of the invention.

The flow diagram in FIG. 7A illustrates one embodiment of scoring clusters. In Block 705, a topic is identified. In one embodiment, the topic is customized to a user. For example, the topic may be in the form of a query of key word(s) initiated by the user. The topic may also be identified from a personalized page belonging to the user. The topic may also be selected from a generic web page which allows users to select different topic categories of interest.

In Block 710, clusters that are matched to the topic are identified. For example, clusters which are similar to the topic may be identified.

The identified clusters may be scored on various factors within the Blocks 715, 720, 725, 730, and 735. In Block 715, these clusters are scored based on the recency of canonical documents within each cluster. For example, a cluster with the most recent canonical documents may be scored higher than other clusters.

The recency of canonical documents may be computed for the cluster by using a weighted sum over the original documents within the cluster. In one example, a weighting scheme is utilized where a higher weight is given for fresher and more recent document.

In one embodiment, each document within a cluster may be sorted and assigned a bin that corresponds with the age of the document. Each bin is configured to accept documents within a time range and corresponds with a specific weighting factor. The specific weighting factor corresponds with the time range of the documents within the bin. In one embodiment, the weighting factor increases as the time range corresponds with more recent documents.

Figure 7B:
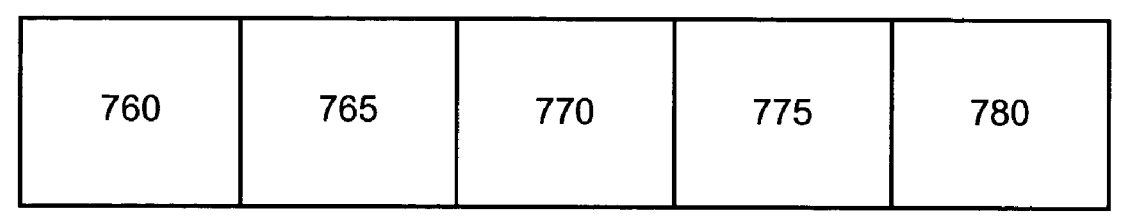

FIG. 7B illustrates the use of bins relative to the weighted sum in computing the recency of coverage. Bins 760, 765, 770, 775, and 780 are shown for exemplary purposes. Additional or fewer bins may be utilized without departing from the scope of the invention.

For example, the bin 760 may have a time range which includes documents that have aged less than 60 minutes. In this example, the documents within the bin 760 are assigned a weighting factor of 24. The bin 765 may have a time range which includes documents that have aged more than 60 minutes and less than 2 hours. In this example, the documents within the bin 765 are assigned a weighting factor of 20. The bin 770 may have a time range which includes documents that have aged more than 2 hours and less than 4 hours. In this example, the documents within the bin 770 are assigned a weighting factor of 15. The bin 775 may have a time range which includes documents that have aged more than 4 hours and less than 24 hours. In this example, the documents within the bin 775 are assigned a weighting factor of 3. The bin 780 may have a time range which includes documents that have aged more than 24 hours. In this example, the documents within the bin 780 are assigned a weighting factor of −1.

Different weighting factors and time ranges may be utilized without departing from the scope of the invention.

In use, the cluster score may be calculated, in part, by multiplying the number of documents within each bin with the corresponding weighting factor and summing the results from each of these multiplications. For example, a cluster contains documents with the following distribution of documents: bin 760 contains 2 documents, bin 765 contains 0 documents, bin 770 contains 1 document, bin 775 contains 5 documents, and bin 780 contains 10 documents. A sample calculation for a cluster score, based on the sample weighting factors and document distribution as described above, is shown in Equation 1.

$$\text{sample cluster score}=3\times24+0*20+1*15+5*3+10*-1 \quad \text{Equation 1}$$

In Block 720, the clusters may be scored based on the quality of the sources that contribute documents within each cluster. For example, the sources may be ranked on an absolute grade. According to this example, a well-known source such as the Wall Street Journal may be ranked higher than a local source such as the San Jose Mercury News regardless of the topic.

The importance of a source may also be computed based on the notoriety of the source. For example, the source may be computed based on the number of views or hits received by the source. In another example, the importance of a source may be computed based on the circulation statistics of the source. In yet another embodiment, the importance of the source may be based on the number of links for each of the documents published by the source and within the cluster.

In addition, the quality of the source may be based on the importance of the source relative to the particular topic. For example, with an document relating to a news story, sources such as CNN, New York Times, Los Angeles Times, and Reuters may be included with a top tier source category; sources such as XYZ News and Any City Times may be included in a second tier source category; and sources such as local news organizations may be included in a third tier source category.

The importance of the source may depend, at least in part, on the subject matter of the particular document and may change with each unique topic. For example, with a query and associated documents relating to a local news story, the local news organizations where the event which is identified in the query is located may be included within the top tier source category. These local news organizations may typically be included within the third tier source category for a national event/story, however due to the local nature of the event related to the query, these local news organizations may be elevated to the top tier source category for this particular query based on geography.

The importance of the source may be proportional to the percentage of documents from the source which match the subject matter of the topic. For example, if the topic relates to the subject of "music", then a source which may be considered important is MTV, because the majority of MTV's prior documents are related to music. The importance of the sources may also change over a period of time for the same topic depending on the subject matter of the documents.

In Block 725, the clusters are scored based on the number of canonical documents contained within each cluster. For example, the cluster may be scored higher when there are more canonical documents within the cluster.

In Block 730, the clusters may be scored based on the number of sub-clusters within each cluster. For example, the number of sub-clusters within a cluster may be utilized to measure the amount of diversity of documents within the cluster.

In Block 735, the clusters may be scored based on a match between the subject of the cluster and a set of predetermined topics. For example, the set of predetermined topics are deemed as important topics such as world news, national news, and the like. A cluster may be scored higher when there is a match between the subject of the cluster and one of the set of predetermined topics.

In Block 740, each of the clusters may be scored according to parameters such as recency of documents, quality of sources, number of documents, number of sub-clusters, and important topics. In one embodiment, the score for each clusters may be calculated by adding up the scores attributed by the parameter analyzed in the Blocks 715, 720, 725, 730, and 735. In one embodiment, these scores may be stored within the database 140. In addition, the clusters are sorted by score.

Figure 8:
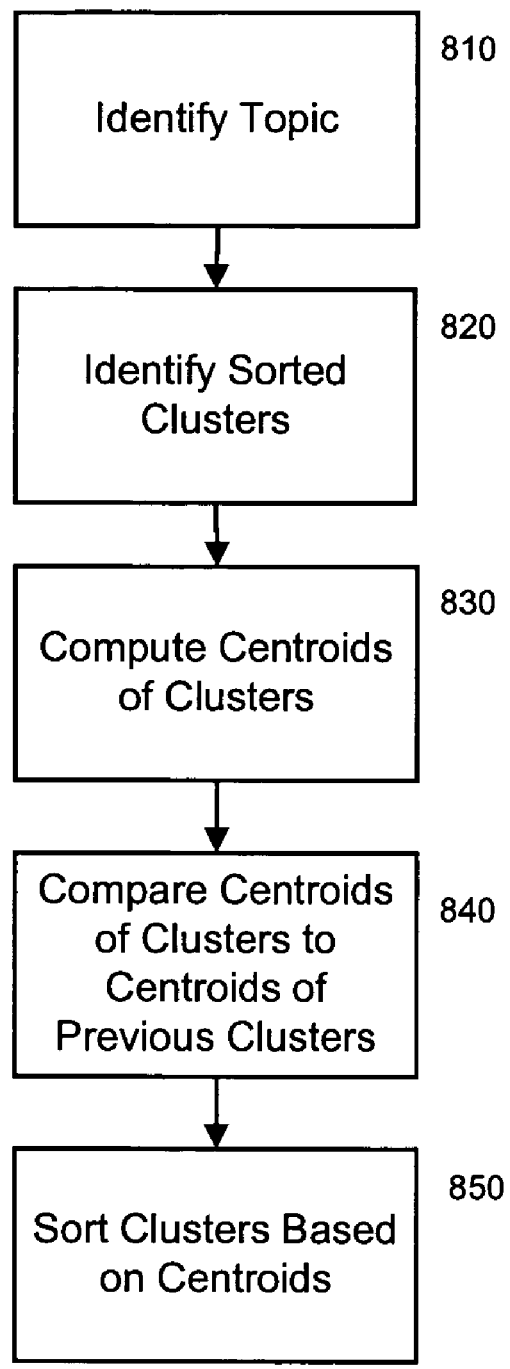
FIG. 8 is a flow diagram for sorting clusters, consistent with one embodiment of the invention.

The flow diagram in FIG. 8 illustrates one embodiment of sorting clusters. In Block 810, a topic is identified. In one embodiment, the topic is customized to a user. For example, the topic may be in the form of a query of key word(s) initiated by the user. The topic may also be identified from a personalized page belonging to the user. The topic may also be selected from a generic web page which allows users to select different topic categories of interest.

In Block 820, clusters that are already sorted by the Block 780 are identified.

In Block 830, centroids may be computed for each cluster. Typically, the centroid uniquely describes the topic or subject matter of the cluster. In one example, the centroid is computed by averaging individual term vectors from the documents contained within the cluster. The term vectors may include a weighted set of terms.

In Block 840, the centroids of the sorted clusters may be compared with the centroids of previously viewed clusters. If the centroid of a particular cluster is similar to the centroids of the previously viewed clusters, this particular cluster may be rated lower than other sorted clusters which are not similar to the centroids of previously viewed clusters. The similar particular cluster may be rated lower than dissimilar sorted clusters, because the user has already viewed documents which are related to the similar particular cluster.

In Block 850, the clusters identified in the Block 820 may be sorted based on the comparison between the centroids of these clusters and the centroids of previously viewed clusters.

Figure 9:
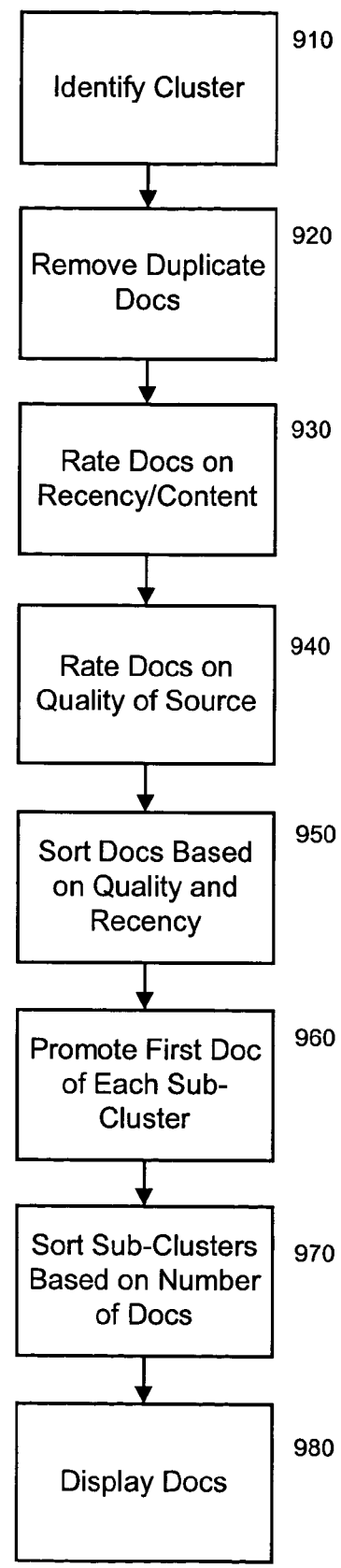
FIG. 9 is a flow diagram for ranking documents within a cluster, consistent with one embodiment of the invention.

The flow diagram in FIG. 9 illustrates one embodiment of ranking and displaying documents within a cluster. In Block 910, a cluster is identified. In Block 920, duplicate documents within the cluster may be removed. For example, canonical documents remain within the clusters.

In Block 930, the documents within the cluster may be rated for recency and/or content. With regards to recency for example, if a document is ten (10) hours old, the document is assigned a recency score of ten (10) hours. In assigning a recency score, the measurement of recency may be defined as the difference in time between the present time and the time of publication. In another embodiment, the measurement of recency may be defined as the difference in time between publication of the document and the time of a corresponding event. In yet another embodiment, the measurement of recency may be defined as the difference in time between the present time and the time of an event corresponding to the document.

In addition to recency, the documents may also be scored according to the length of a document, the title of a document, and genre of a document. For example, in one embodiment, the longer the document is, the higher the particular document may be scored.

The title of the document may be analyzed in a variety of ways to aide in scoring the document. For example, the length of the title may be utilized to score the document with a longer title scoring a higher score.

In another example, the title may be searched for generic terms such as "News Highlights", "News Summary", and the like. In one embodiment, the higher percentage of generic terms used with the title, the lower the document may be scored. By the same token, use of proper nouns in the title may increase the score of the document. In yet another example, the words within the title may be compared with the centroid of the cluster which contains the document. In one embodiment, the score of the document is higher if the title contains words that overlap or match the centroid of the cluster.

Based on the content of the document, the document may belong to a specific genre such as "op/ed", "investigative report", "letter to the editor", "news brief", "breaking news", "audio news", "video news", and the like. The score of the document may increase if the genre of the document matches the genre of a query. In one embodiment, the query specifies a particular genre. In another embodiment, the query includes the genre which passively specified by the user as a preference.

In Block 940, the documents within the cluster may be rated for quality of the corresponding source. Rating the quality of the corresponding source is demonstrated in the Block 350 (FIG. 3).

The measurement of recency for a document (as described in the Block 930) may be taken into account with the quality of the corresponding source.

For example, if a document is assigned a recency score of ten (10) hours and the corresponding source is considered a golden source, then a modified recency score is ten subtracted by X (10−X) hours where X is a selected value based on the quality of the source. In this example, the modified recency score is less than the original recency score, because the corresponding source is considered a golden source.

In another example, if a document is assigned a recency score of ten (10) hours and the corresponding source is considered a lowest category, then a modified recency score is ten added by Y (10+Y) hours where Y is a selected value based on the quality of the source. In this example, the modified recency score is greater than the original recency score, because the corresponding source is considered a lowest category.

In Block 950, the documents may be sorted by recency of the document and quality of the source. The documents may be sorted by the modified recency score as shown in the Block 940. In one embodiment, the documents are sorted with the most recent documents listed first.

In Block 960, the most recent document within each sub-cluster of the cluster is identified and included as part of a displayed list of documents. The displayed list of documents utilizes an order with the most recent document listed first according to the modified recency score.

In Block 970, the documents within the displayed list of documents as described in the Block 960 are weighted by the number of documents within the corresponding sub-cluster. In one embodiment, the modified recency score is further modified. For example, the more documents within a particular sub-cluster may increase the importance of the documents within the sub-cluster. In other words, the individual documents within the displayed list of documents are weighted based on the number of documents within the sub-cluster.

In one example, a first and second document may each have a modified recency score of ten (10) hours. However, the first document is within a sub-cluster which includes twenty (20) documents, and the second document is within a sub-cluster which includes ten (10) documents. According to one embodiment, the first document has a new modified recency score of eight (8) hours based on the weighting of the number of documents within the sub-cluster. The second document has a new modified recency score of twelve (12) hours based on the weighting of the number or documents within the sub-cluster. Accordingly, the first document has a lower modified recency score than the second document and may be in a higher priority position to be viewed or displayed.

In Block 980, the displayed list of documents is shown to the user. The documents within the displayed list of documents may be shown to the user based on the modified recency score as formed in the Block 960. The documents within the displayed list of documents may be shown to the user based on the modified recency score as modified in the Block 970.

C. CONCLUSION

The foregoing descriptions of specific embodiments of the invention have been presented for purposes of illustration and description. For example, the invention is described within the context of documents as merely one embodiment of the invention. The invention may be applied to a variety of other electronic data such as pictures, audio representations, graphic images, and the like.

For the sake of clarity, the foregoing references to "browser" are a figurative aid to illustrate a particular device which is utilized by a specific user.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method of scoring a source, comprising:
   identifying the source;
   detecting a plurality of documents published by the source;
   calculating measures of freshness of the plurality of documents based on determining a difference between times that events occur and times that the identified source published the plurality of documents that includes content relating to the events;
   calculating measures of quality for the plurality of documents based on at least one of:
      numbers of views of the plurality of documents during a time period, or
      numbers of links pointing to the plurality of documents; and
   determining a source score for the source based on the measures of freshness and the measures of quality.

2. The method according to claim 1 where the calculating measures of freshness is further based on:
   determining a number of canonical documents within the plurality of documents.

3. The method according to claim 1 further comprising:
   removing a duplicate document within the plurality of documents.

4. The method according to claim 3 where the removing a duplicate document includes:
   comparing text of one of the plurality of documents with text of another one of the plurality of documents to determine the duplicate document.

5. The method according to claim 1 where the determining a source score is further based on an originality of the plurality of documents.

6. The method according to claim 1 where the calculating measures of freshness is further based on:
   measuring a frequency in which the source generates a canonical document.

7. The method according to claim 6 where measuring the frequency occurs over a predetermined length of time.

8. The method according to claim 1 where the times that the source published the plurality of documents is determined by a time stamp of publication.

9. The method according to claim 1 further comprising:
   weighting at least one of the measures of freshness or the measures of quality prior to the determining the source score.

10. The method according to claim 1 further comprising categorizing the source based on the source score.

11. The method according to claim 1 where the plurality of documents includes a plurality of articles.

12. A computer-readable medium having computer executable instructions for performing a method comprising:
    identifying a news source;
    detecting a plurality of documents published by the news source;
    calculating a measure of freshness of a first document of the plurality of documents based on determining a difference between a time that an event occurred and a time that the identified news source published the first document that includes content relating to the event;
    calculating a measure of quality for a second document of the plurality of documents based on at least one of:
       numbers of views of the second document during a time period, or
       numbers of links pointing to the second document; and
    determining a source score for the news source based on the measure of freshness and the measure of quality.

13. The computer-readable medium of claim 12, where the method further comprises:
    removing a duplicate document within the plurality of documents.

14. The computer-readable medium of claim 13 where the removing a duplicate document includes:-
    comparing text of one of the plurality of documents with text of another one of the plurality of documents to determine the duplicate document.

15. The computer-readable medium of claim 12, where the method further comprises:
    placing the news source into a category based on the source score.

16. The computer-readable medium of claim 12 where the calculating a measure of freshness is further based on:
    determining a number of canonical documents within the plurality of documents.

17. The computer-readable medium of claim 12 where the determining a source score is further based on an originality of the plurality of documents.

18. The computer-readable medium of claim 12 where the calculating a measure of freshness is further based on:

measuring a frequency in which the news source generates a canonical document.

19. The computer-readable medium of claim 18 where measuring the frequency occurs over a predetermined length of time.

20. The computer-readable medium of claim 12 where the time that the news source published the first document is determined by a time stamp of publication.

21. The computer-readable medium of claim 12 where the method further comprises:

weighting at least one of the measure of freshness or the measure of quality prior to the determining the source score.

22. A system for scoring a source, comprising:

means for identifying the source;

means for detecting a plurality of documents published by the source;

means for calculating a measure of freshness of a first document of the plurality of documents based on determining a difference between a time that an event occurred and a time that the source published the first document that includes content relating to the event;

means for calculating a measure of quality for a second document of the plurality of documents based on at least one of:

numbers of views of the second document during a time period, or numbers of links pointing to the second documents;

means for determining a source score for the source based on the measure of freshness and the measure of quality; and a memory device to store the source score.

23. The system of 22, further comprising:

means for removing duplicate documents in the plurality of documents.

24. The system of claim 22, further comprising:

means for associating the source with a category based on the source score; and means for storing the association between the source and the category.

25. A computer-implemented method comprising:

identifying a news source;

detecting a plurality of news articles published by the news source;

removing news articles in the plurality of news articles that are determined to be duplicates of other news articles in the plurality of news articles to form a second plurality of news articles;

calculating measures of freshness of the second plurality of news articles based on determining a difference between times that events occur and the news source published the second plurality of news articles that includes content relating to the events;

calculating measures of quality for the second plurality of news articles based on at least one of:

numbers of views of the second plurality of news articles during a time period, or numbers of links pointing to the second plurality of news articles;

determining a score for the news source based on the measures of freshness and the measures of quality; and storing the score for the news source.

26. The method of claim 25 where the removing news articles further includes:

identifying at least one news article of the plurality of news articles that is re-published from another news source; and removing the at least one news article from the plurality of news articles.

27. The method of claim 25 where the determining a score for the news source is further based on a number of news articles published by the news source.

28. The method of claim 25 further comprising:

associating the news source with a category based on the score for the news source.

* * * * *